United States Patent
Motwani et al.

(10) Patent No.: US 11,048,684 B2
(45) Date of Patent: Jun. 29, 2021

(54) LAZY TRACKING OF USER SYSTEM WEB CACHE

(71) Applicant: salesforce.com, inc., San Francisco, CA (US)

(72) Inventors: Vishal Motwani, San Francisco, CA (US); Nick Hansen, San Francisco, CA (US); Vivek Chauhan, San Francisco, CA (US); Thomas Archie Cook, Jr., San Francisco, CA (US); Thomas Keeney, San Francisco, CA (US); Kamyar Seradjfar, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 274 days.

(21) Appl. No.: 15/872,362

(22) Filed: Jan. 16, 2018

(65) Prior Publication Data
US 2019/0220530 A1   Jul. 18, 2019

(51) Int. Cl.

| | |
|---|---|
| *G06F 15/16* | (2006.01) |
| *G06F 16/23* | (2019.01) |
| *G06F 16/27* | (2019.01) |
| *G06F 16/2455* | (2019.01) |
| *H04L 29/08* | (2006.01) |
| *H04L 29/06* | (2006.01) |
| *G06Q 50/00* | (2012.01) |

(52) U.S. Cl.
CPC ...... *G06F 16/2365* (2019.01); *G06F 16/2329* (2019.01); *G06F 16/24552* (2019.01); *G06F 16/27* (2019.01); *H04L 67/1097* (2013.01); *G06Q 50/01* (2013.01); *H04L 63/0281* (2013.01); *H04L 67/2842* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |

(Continued)

FOREIGN PATENT DOCUMENTS

WO   2020/060770 A1   3/2020

*Primary Examiner* — Alex Gofman
(74) *Attorney, Agent, or Firm* — Schwabe Williamson & Wyatt

(57) ABSTRACT

Systems, methods, and computer-readable media for lazy tracking mechanisms for web caching systems are provided. The lazy tracking mechanism may track and perform asynchronous (async) computation of dirty records for client-side caching mechanisms. The async computation of dirty records may include tracking or accounting for invalidated records relevant to a particular client or user system. Invalidation messages may be sent to client/user systems in response to receipt of a request for updated records, or in response to a request for a particular item. Other embodiments may be described and/or claimed.

17 Claims, 7 Drawing Sheets

(56) References Cited

U.S. PATENT DOCUMENTS

| | | |
|---|---|---|
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,341,279 B2 | 7/2019 | Seymour et al. |
| 10,585,925 B2 | 3/2020 | Louie et al. |
| 10,642,745 B2 | 5/2020 | Hansen |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |

(56) References Cited

U.S. PATENT DOCUMENTS

| | | |
|---|---|---|
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0197032 A1* | 8/2011 | Patey ................ G06F 16/24552 711/133 |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2015/0058535 A1* | 2/2015 | Lasser ................ G06F 12/0246 711/103 |
| 2016/0070717 A1* | 3/2016 | Bergner ................ G06F 16/178 707/638 |
| 2016/0104067 A1 | 4/2016 | Xu et al. |
| 2016/0162128 A1 | 6/2016 | Hansen et al. |
| 2017/0031939 A1* | 2/2017 | Wenzel ............... G06F 16/1727 |
| 2019/0147081 A1* | 5/2019 | Demla ................... G06F 16/26 707/722 |
| 2019/0180195 A1* | 6/2019 | Terry ...................... G06F 16/34 |
| 2020/0201837 A1 | 6/2020 | Motwani et al. |
| 2020/0210257 A1 | 7/2020 | Cook et al. |

\* cited by examiner

LAZY TRACKING OF USER SYSTEM WEB CACHE

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to database systems and web caching systems, and. in particular to systems and methods for asynchronously (or "lazily") tracking changes to web or database objects for client-side web cache.

BACKGROUND

In multi-tenant database systems, customer organizations (also referred to as "tenants") may share database resources in one logical database. The databases themselves are typically shared, and each tenant is typically associated with an organization identifier (org ID) column or field that may be used to identify rows or records belonging to each tenant. Users of a multi-tenant database system (e.g., a tenant/organization (org) or developers associated with the tenant) may develop applications or platforms that interact or integrate with the multi-tenant database system and utilize data from an associated tenant space. The applications/platforms may obtain data from the associated tenant space to render/display visual representations of relevant tenant data. In some cases, the applications/platforms may utilize tenant data for interacting with clients, and may include program code or script(s) that call an application programming interface (API) to obtain and manipulate data, create and execute the sending of various messages based on various triggering events, and/or other like functions.

In multi-tenant database systems, application servers and user systems that interact with the application servers may implement web caching mechanisms. The functioning of user system caching requires the server to inform the user system about changes made to database objects (e.g., records). In this way, the user system may request the database objects again to keep the user system cache up-to-date. In order to inform the user system about updated database objects, the server may generate and send an invalidation message to the user system to indicate changed/altered. database objects. This may require the server to track the database objects, and updates to the database objects for various user systems. However, tracking the database objects for multiple user systems can consume large amounts of computational resources, and sending multiple invalidation signals to the clients can consumer large amounts of network resources. Furthermore, the computational and network resource usage may increase as the tenants/orgs (and their applications/platforms) grow in size, scope, and complexity. With such growth comes the significant challenge of how to effectively and efficiently process and transmit the invalidation messages to their intended recipients. It may be difficult for multi-tenant database system operators to quickly and effectively transmit these messages thereby resulting in increased resource overhead, which could cause system slowdowns and/or user dissatisfaction.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
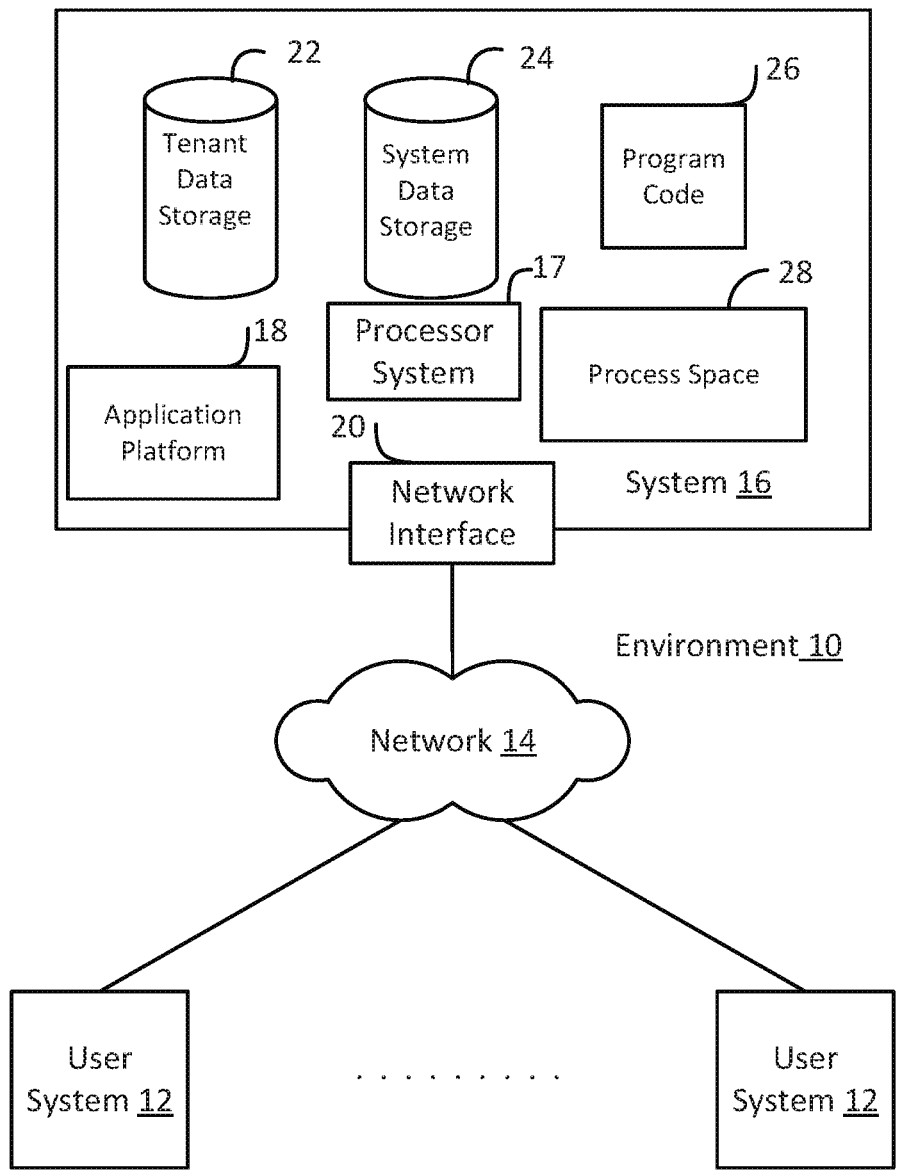
FIG. 1A shows a block diagram of an example environment in which an on-demand database service can be used according to some implementations.

Embodiments discussed herein provide lazy tracking mechanisms to reduce computational and network overhead associated with the user system and/or application server caching systems. The lazy tracking mechanism may track and perform asynchronous (async) computation of dirty records for client-side cache. The async computation of dirty records may include tracking or accounting for invalidated records relevant to a particular client or user system. An application server may send invalidation messages to client/user systems in response to receipt of a request for updated records, or in response to a request for a particular item. Other embodiments may be described and/or claimed.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring of the disclosed implementations. Other implementations and applications are also possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in sonic other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed. to systems, apparatus, computer-implemented methods and computer-readable storage media for identifying articles helpful in resolving user queries.

As used herein, the term "tenant" may include a group of users who share common access with specific privileges to a software instance. A multi-tenant architecture, such as those discussed herein, may provide a tenant with a dedicated share of a software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants. As used herein, the term an "instance" may refer to a concrete occurrence of an object, which may occur, for example, during execution of program code, and the terms "instantiate", "instantiation", and the like may refer to the creation of an instance.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. in some other implementations, enviromnent 10 may not have all of these components or systems, or may have other components or systems instead of, or in addition to, those listed above.

In embodiments, the tenant data storage 22, the system data storage 24, and/or some other data store (not shown) may include Extract-Load-Transform (ELT) data or Extract-Transform-Load (ETL) data, which may be raw data extracted from various sources and normalized (e.g., indexed, partitioned, augmented, canonicalized, etc.) for analysis and other transformations. In some embodiments, the raw data may be loaded into the tenant data storage 22, the system data storage 24, and/or some other data store (not shown) and stored as key-value pairs, which may allow the data. to be stored in a mostly native form without requiring substantial normalization or formatting.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The tem "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and web page content. In some NITS implementations, data for multiple tenants may be stored in the same physical database object in tenant database 22. In sonic such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16. The applications of the application platform 18 may be developed with server-side programming languages, such as PI-IP, Java and/or Java Server Pages (JSP), Node.js. ASP-.NET, and/or any other like technology that renders HTML. The applications may be built using a platform-specific and/or proprietary development tool and/or programming languages, such as Salesforce® Apex and/or the like.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. it should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a local area network (LAN), wide area network (WAN), telephone network, wireless network, cellular network, point-to-point network, star network, token ring network, hub network, or other appropriate configuration. The network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as Hypertext Transfer Protocol (HTTP), File Transfer Protocol (FTP), Andrew File System (AFS), Wireless Application Protocol (WAP), Session initiation Protocol (SIP) with Real-Time Transport Protocol (RTP or Secure RTP (SRTP), WebSocket protocol, etc. In an example where HTTP is used, each user system 12 can include an HTTP client commonly referred to as a "web browser" or simply a "browser" for sending and receiving HTTP signals to and from an HTTP server (also referred to as a "web server") of the system 16. In this example, each user system 12 may send and receive HTTP messages where a header of each message includes various operating parameters and the body of the such messages may include hypertext markup language (HTML), extensible markup language (XML), JavaScript Object Notation (JSON), etc. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, WAP-enabled device, or other computing device capable of interfacing directly or indirectly to the Internet or other network. The terms "user system" and "computing device" are used interchangeably herein with one another and with the term "computer."

As described above, each user system 12 typically executes an HTTP client, for example, a web browsing (or simply "browsing") program, such as a web browser based on the WebKit platform, Microsoft's Internet Explorer browser. Apple's Safari, Google's Chrome, Opera's browser, or Mozilia's Firefox browser, and/or the like, to execute and render web applications allowing a user (for example, a subscriber of on-demand services provided by the system 16) of the user system 12 to access, process and view information, pages, interfaces, and applications available to it from the system 16 over the network 14. In other implementations, each user system 12 may operate a user (or third party) application designed to interact with applications of the application platform 18 allowing a user (for example, a subscriber of on-demand services provided by the system 16) of the user system 12 to access, process and view information, pages and applications available to it from the system 16 over the network 14. The user application may be platform-specific, such as when the user system 12 is implemented in a mobile device, such as a smartphone, tablet computer, and the like. This application may be a native application (e.g., executed and rendered in an application container or skeleton) or a hybrid application (e.g., web applications being executed/rendered in an application container/skeleton).

The (web or third party) applications may be built using website development tools and/or programming languages, such as HTML, Cascading Stylesheets (CSS), JavaScript, JQuery, and the like; and/or using platform-specific development tools and/or programming languages (e.g., Salesforce® Apex, Salesforce® Visualforce®, Salesforce® Lightning®, Salesforce® Wave™ Dashboard Designer, Salesforce® Force.com® IDE, Android® Studio™ integrated development environment (IDE), Apple® iOS® software development kit (SDK), etc.). The term "platform-specific" may refer to the platform implemented by the user system 12 and/or the platform implemented by the database system 16. Furthermore, such applications may utilize a suitable querying language to query and store information in an associated tenant space, such as Structure Query Language (SQL), object query language (OQL), Salesforce® OQL (SOQL), Salesforce® object search language (SOSL), Salesforce® analytics query language (SAQL), and/or other like query languages.

Regardless of whether this application is a native application, web application, or hybrid application, the user systems 12 may implement such applications to request and obtain data from database system 16, and render graphical user interfaces (GUIs) in an container or browser. In various embodiments, the GUIs may include a data analytics GUI, such as Salesforce® Wave™ dashboard, which may provide visual representations of data residing in an enterprise cloud or in an on-demand services environment (e.g., a tenant space within database system 16). In embodiments, the GUI may include one or more graphical control elements (GCEs) or widgets, which may enable a user of a user system 12 to select visualization parameters (also referred to as "lens parameters" or "filters") for displaying data from one or more datasets. A dataset may be a specific view or transformation of data from one or more data sources (e.g., a tenant space of database 22, etc.). The visualization parameters may include, for example, a selection of data or data type to display from one or more datasets; a particular graph, chart, or map in which to view the selected data; color schemes for the graphs/charts/maps; a position or orientation of the graphs/charts/maps within the GUI, etc. The graphs/charts/maps to be displayed may be referred to as a "lens" or a "dashboard". A lens may be a particular view of data from one or more datasets, and a dashboard may be a collection of lenses. In embodiments, the GUI may display lenses, dashboards, and/or control panels to alter or rearrange the lenses/dashboards.

Each user system 12 typically includes an operating system (OS) to manage computer hardware and software resources, and provide common services for various applications. The OS may include one or more drivers and/or APIs that provide an interface to hardware devices thereby enabling the OS and applications to access hardware functions. In some embodiments, the OS may include middleware that may connect two or more separate applications or connect applications with underlying hardware components beyond those available from OS and/or the drivers/APIs. The OS may be a general purpose operating system or an operating system specifically written for and tailored to the user system 12.

Each user system 12 also typically includes one or more user input devices, such as a keyboard, a mouse, a trackball, a touch pad, a touch screen, a pen or stylus or the like, for interacting with a GUI provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using one or more central processing units (CPUs) and/or other like computer processing devices, such as Intel Pentium® or Core® processor(s); Advanced Micro Devices (AMD) Ryzen® processor(s) or Accelerated Processing Units (APUs); or the like. Similarly, the system 16 (and additional instances of an MTS, where more than one is present) and all of its components can be operator-configurable using application(s) including computer code to run using the processor system 17, which may include one or more CPUs/processors, which may include one or multiple Intel Pentium® or Xeon® processors, one or more AMD Epyc® processors, or the like.

The system 16 includes tangible computer-readable media having non-transitory instructions stored thereon/in that are executable by or used to program a server (e.g., the app servers 100 and OMNI entities 300/message servers discussed herein) or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs). or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
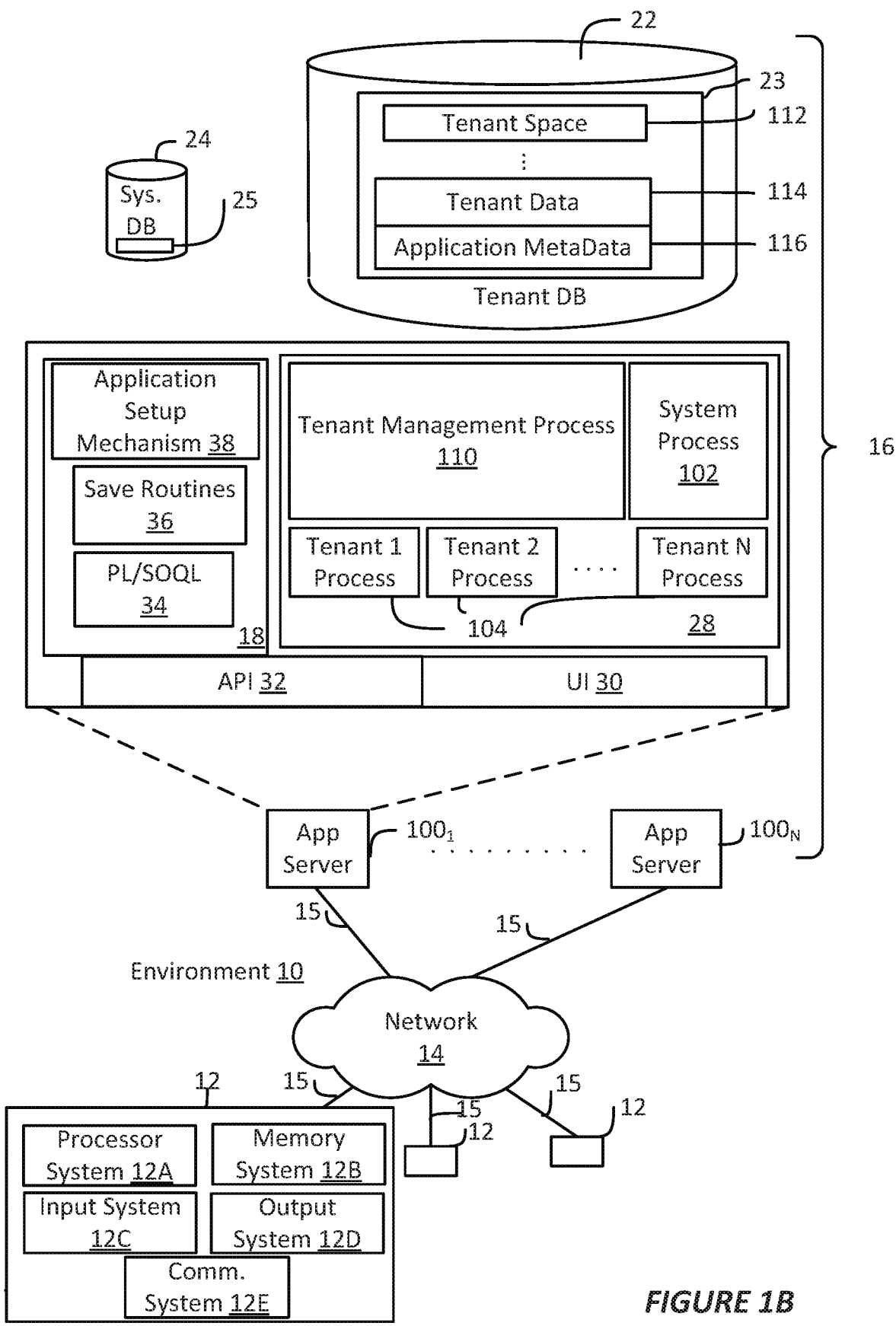
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 19 also illustrates environment 10, but FIG. 19, various elements of the system 16 and various interconnections between such elements are shown with more specificity according to some more specific implementations. Additionally, in FIG. 1B, the user system 12 includes a processor system 12A, a memory system 12B, an input system 12C, an output system 12D, and a communications system 12E. The processor system 12A can include any suitable combination of one or more processors, such as one or more central processing units (CPUs) including single-core or multi-core processors (such as those discussed herein), one or more graphics processing units (GPUs), one or more field-programmable gate arrays (FPGAs), or any other electronic circuitry capable of executing program code and/or software modules to perform arithmetic, logical, and/or input/output operations. The memory system 12B can include any suitable combination of one or more memory devices, such as volatile storage devices (e.g., random access memory (RAM), dynamic RAM (DRAM), etc.) and non-volatile memory device (e.g., read only memory (ROM), flash memory, etc.). The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

The communications system 12E may include circuitry for communicating with a wireless network or wired network. Communications system 12E may be used to establish a link 15 (also referred to as "channel 15," "networking layer tunnel 15," and the like) through which the user system 12 may communicate with the database system 16. Communications system 12E may include one or more processors (e.g., baseband processors, network interface controllers, etc.) that are dedicated to a particular wireless communication protocol (e.g., Wi-Fi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols, Bluetooth or Bluetooth low energy (BLE), etc.), and/or a wired communication protocol (e.g., Ethernet, Fiber Distributed Data interface (FDDI), Point-to-Point (PPP), etc.). The communications system 12E may also include hardware devices that enable communication with wireless/wired networks and/or other user systems 12 using modulated electromagnetic radiation through a solid or non-solid medium. Such hardware devices may include switches, filters, amplifiers, antenna elements, and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the database system 16, the user system 12 using the communications system 12E may establish link 15 with network interface 20 of the database system 16.

In FIG. 1B, the network interface 20 is implemented as a set of HTTP application servers $100_1$-$100_N$. Each application server 100 (also referred to herein as an "app server", an "application programming interface (API) server", a "worker node", and/or the like) is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an API 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database and system database 24, for example, having access to tenant data 23 and system data 25, respectively, via a different network connection 15. For example, one application server 100$_1$ can be coupled via the network 14 (for example, the Internet), another application server 100$_N$ can be coupled via a direct network link 15, and another application server 100$_N$ can be coupled by yet a different network connection 15. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. In this regard, each application server 100 may be configured to perform various database functions (e.g., indexing, querying, etc,) as well as formatting obtained data (e.g., ELT data, ETL data, etc.) for various user interfaces to be rendered by the user systems 12. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MIS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MIS can support multiple tenants including possible competitors, the MIS can have security protocols that keep data, applications, and application use separate. Also, because many tenants may opt for access to an MIS rather than maintain their own system, redundancy, up-time, and backup are additional functions that can be implemented in the MIS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. As used herein, a "database object", "data object", or the like may refer to any representation of information in a database that is in the form of an object or tuple, and may include variables, data structures, functions, methods, classes, database records, database fields, database entities, associations between data and database entities (also referred to as a "relation"), and the like. A. "table" is one representation of a data object, and may be used herein to simplify the conceptual description of objects and custom objects according to some implementations. It should be understood that "table" and "data(base) object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
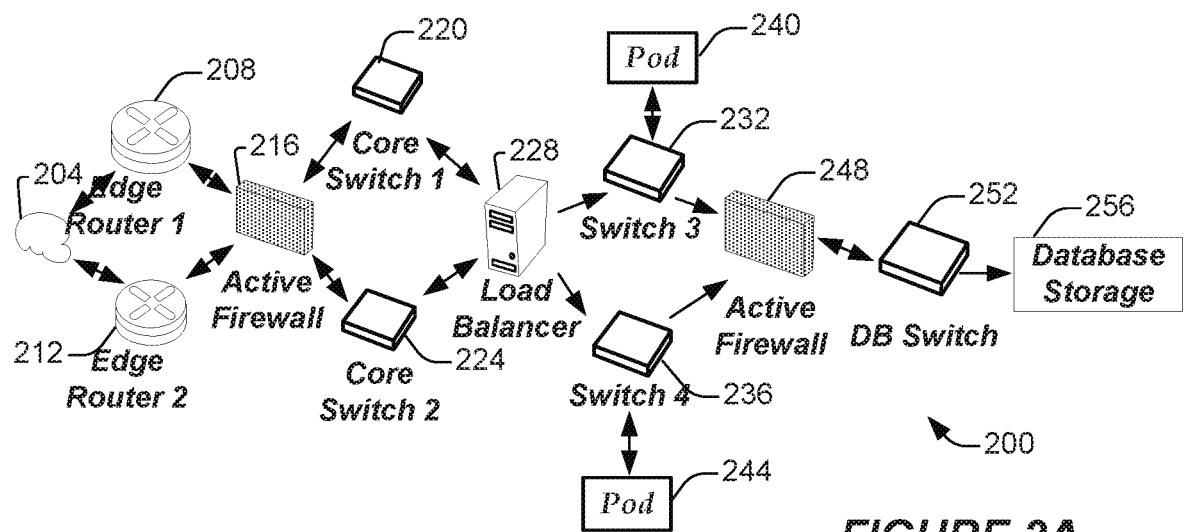
FIG. 2A shows a system diagram of example architectural components of an on-demand database service environment according to some implementations.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. The pods 240 and 244, which can each include one or more servers or other computing resources, can perform data processing and other operations used to provide on-demand services. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, hardware time or usage, electrical power, input/output operations, ports or network sockets, channel/link allocation, throughput, and/or the like. As used herein, the term "network resource" may refer to computing resources that are accessible by computer devices via a communications network. Communication with the pods can be conducted via pod switches 232 and 236. Components of the on-demand database service environment can communicate with database storage 256 through a database firewall 248 and a database switch 252.

Figure 2B:
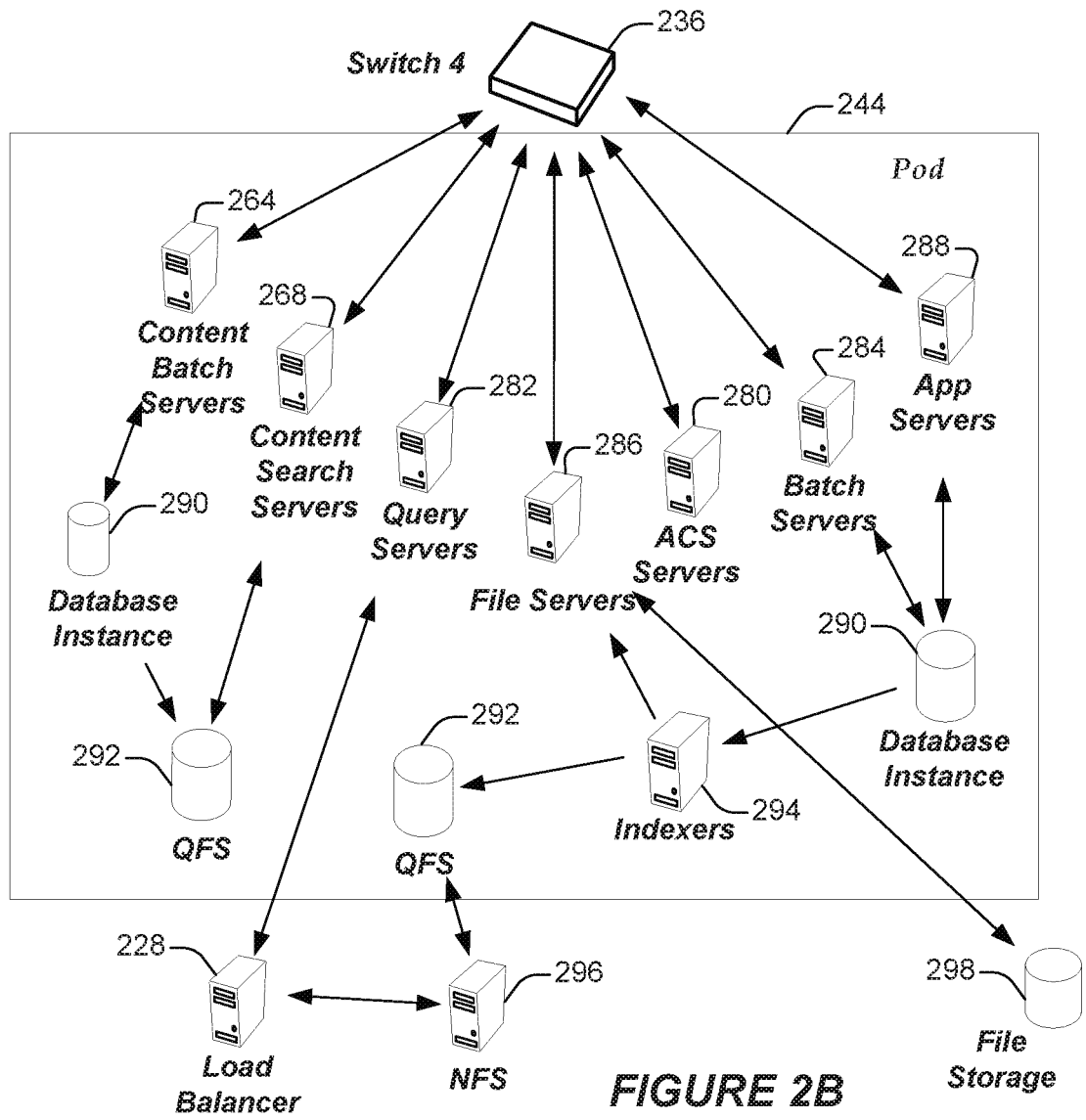
FIG. 2B shows a system diagram further illustrating example architectural components of an on-demand database service environment according to some implementations.

As shown in FIGS. 2A and 29, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to several devices of each type. Also, the on-demand database service environment need not include each device shown in FIGS. 2A and 29, or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 204 is intended to refer to a data network or multiple data networks, often including the Internet. Client machines communicably connected with the cloud 204 can communicate with other components of the on-demand database service environment 200 to access services provided by the on-demand database service environment. For example, client machines can access the on-demand database service environment to retrieve, store, edit, or process information. In some implementations, the edge routers 208 and 212 route packets between the cloud 204 and other components of the on-demand database service environment 200. For example, the edge routers 208 and 212 can employ the Border Gateway Protocol (BGP), The BGP is the core routing protocol of the Internet. The edge routers 208 and 212 can maintain a table of IP networks or 'prefixes', which designate network reachability among autonomous systems on the Internet.

In some implementations, the firewall 216 can protect the inner components of the on-demand database service environment 200 from Internet traffic. The firewall 216 can block, permit, or deny access to the inner components of the on-demand database service environment 200 based upon a set of rules and other criteria. The firewall 216 can act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 can be configured as network bridges that quickly route data between different components within the on-demand database service environment. In some implementations, the use of two or more core switches 220 and 224 can provide redundancy or reduced latency.

In some implementations, the pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between the pods 240 and 244 is conducted via the pod switches 232 and 236. The pod switches 232 and 236 can facilitate communication between the pods 240 and 244 and client machines communicably connected with the cloud 204, for example via core switches 220 and 224. Also, the pod switches 232 and 236 may facilitate communication between the pods 240 and 244 and the database storage 256. In sonic implementations, the load balancer 228 can distribute workload between the pods 240 and 244. Balancing the on-demand service requests between the pods can assist in improving the use of resources, increasing throughput, reducing response times, or reducing overhead. The load balancer 228 may include multilayer switches to analyze and forward traffic.

In some implementations, access to the database storage 256 is guarded by a database firewall 248. The database firewall 248 can act as a computer application firewall operating at the database application layer of a protocol stack. The database firewall 248 can protect the database storage 256 from application attacks such as structure query language (SQL) injection, database rootkits, and unauthorized information disclosure. In some implementations, the database firewall 248 includes a host using one or more forms of reverse proxy services to proxy traffic before passing it to a gateway router. The database firewall 248 can inspect the contents of database traffic and block certain content or database requests. The database firewall 248 can work on the SQL application level atop the TCP/IP stack, managing applications' connection to the database or SQL management interfaces as well as intercepting and enforcing packets traveling to or from a database network or application interface.

In some implementations, communication with the database storage 256 is conducted via the database switch 252. The multi-tenant database storage 256 can include more than one hardware or software components for handling database queries. Accordingly, the database switch 252 can direct database queries transmitted by other components of the on-demand database service environment (for example, the pods 240 and 244) to the correct components within the database storage 256. In some implementations, the database storage 256 is an on-demand database system shared by many different organizations as described above with reference to FIGS. 1A and 1B.

FIG. 2B shows a system diagram further illustrating example architectural components of an on-demand database service environment according to some implementations. The pod 244 can be used to render services to a user of the on-demand database service environment 200. In some implementations, each pod includes a variety of servers or other systems. The pod 244 includes one or more content batch servers 264, content search servers 268, query servers 282, file force servers 286, access control system (ACS) servers 280, batch servers 284, and app servers 288. The pod 244 also can include database instances 290, quick file systems (QFS) 292, and indexers 294. In some implementations, some or all communication between the servers in the pod 244 can be transmitted via the switch 236.

In some implementations, the app servers 288 include a hardware or software framework dedicated to the execution of procedures (for example, programs, routines, scripts) for supporting the construction of applications provided by the on-demand database service environment 200 via the pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods. In various implementations, the app servers 288 may be the same or similar to the app servers 100 discussed herein.

The content batch servers 264 can handle requests internal to the pod. Some such requests can be long-running or not tied to a particular customer. For example, the content batch servers 264 can handle requests related to log mining, cleanup work, and maintenance tasks. The content search servers 268 can provide query and indexer functions. For example, the functions provided by the content search servers 268 can allow users to search through content stored in the on-demand database service environment. The file servers 286 can manage requests for information stored in the file storage 298. The file storage 298 can store information such as documents, images, and basic large objects (BLOBs). By managing requests for information using the file force servers 286, the image footprint on the database can be reduced. The query servers 282 can be used to retrieve information from one or more file systems. For example, the query system 282 can receive requests for information from the app servers 288 and transmit information queries to the NFS 296 located outside the pod.

The pod 244 can share a database instance 290 configured as a multi-tenant environment in which different organizations share access to the same database. Additionally, services rendered by the pod 244 may call upon various hardware or software resources. In some implementations, the ACS servers 280 control access to data, hardware resources, or software resources. In some implementations, the batch servers 284 process batch jobs, which are used to run tasks at specified times. For example, the batch servers 284 can transmit instructions to other servers, such as the app servers 288, to trigger the batch jobs.

In some implementations, a QFS 292 is an open source file system available from Sun Microsystems® of Santa Clara, Calif. The QFS can serve as a rapid-access file system for storing and accessing information available within the pod 244. The QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in the network file systems 296 or other storage systems.

In some implementations, one or more query servers 282 communicate with the NFS 296 to retrieve or update information stored outside of the pod 244. The NFS 296 can allow servers located in the pod 244 to access information to access files over a network in a manner similar to how local storage is accessed. In some implementations, queries from the query servers 282 are transmitted to the NFS 296 via the load balancer 228, which can distribute resource requests over various resources available in the on-demand database service environment. The NFS 296 also can communicate with the QFS 292 to update the information stored on the NFS 296 or to provide information to the QFS 292 for use by servers located within the pod 244.

In some implementations, the pod includes one or more database instances 290. The database instance 290 can transmit information to the QFS 292. When information is transmitted to the QFS, it can be available for use by servers within the pod 244 without using an additional database call. In some implementations, database information is transmitted to the indexer 294. Indexer 294 can provide an index of information available in the database 290 or QFS 292. The index information can be provided to file force servers 286 or the QFS 292.

Lazy Tracking Mechanisms

Figure 3:
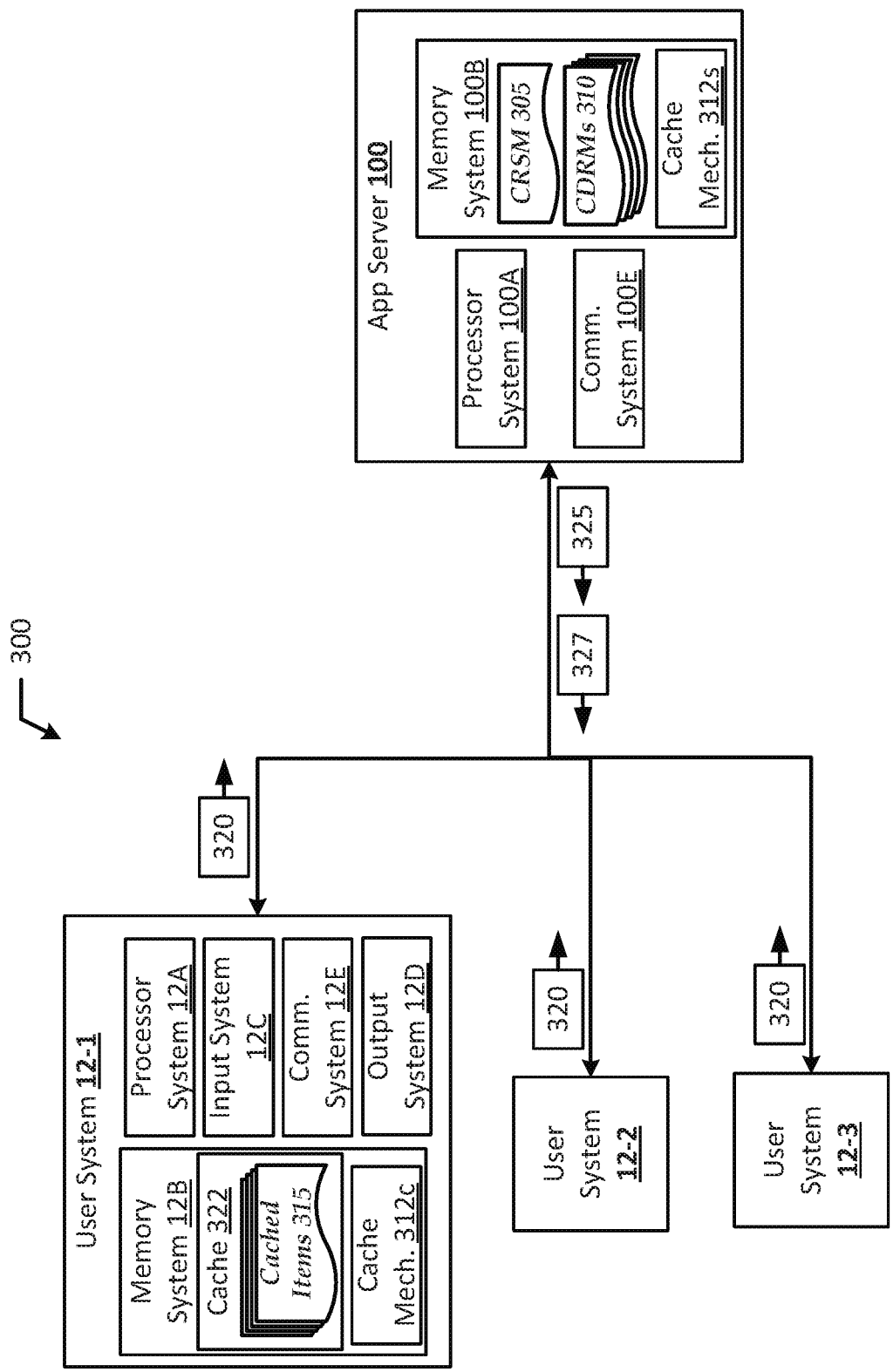
FIG. 3 shows an arrangement in which various embodiments discussed herein may be practiced.

FIG. 3 shows an arrangement 300 in which an app server 100 of the database system 16 may interact with user systems 12-1, 12-2, and 12-3 (collectively referred to as "user systems 12" or "user system 12") in accordance with various embodiments. In FIG. 3, like numbered items are as described with respect to FIGS. 1A-2B (although not all items shown by FIGS. 1A-2B are shown by FIG. 3). In the example shown by FIG. 3, each of the user systems 12 may have the same or similar components. Additionally, the app server 100 may include a processor system 100A, which may be the same or similar to processor system 17 and/or processor system 12A discussed previously; memory system 100B, which may be the same or similar to program code 26 and/or memory system 12B discussed previously; and a communication system 100E, which may be the same or similar to network interface 20 and/or communication system 12E discussed previously.

Referring to the user system 12, the memory system 12B may include cache 322, a caching mechanism 312c, as well as an operating system (OS) (not shown), application(s) (not shown), and one or more databases (not shown). The OS may manage computer hardware and software resources, and provide common services for applications of the user system 12. The OS may include one or more drivers and/or APIs that provide an interface to hardware devices thereby enabling OS, cache 322, a caching mechanism 312c, and application(s) to access hardware functions. The OS may also include middleware that may connect two or more separate applications or connect applications with underlying hardware components beyond those available from OS and/or the drivers/APIs. The OS may be a general-purpose operating system or an operating system specifically written for and tailored to the user system 12.

The application(s) ("app" or "apps") may be a software, program code, logic modules, etc. designed to run on the user system 12, and may be used to access the tenant database system 16 via app server 100 as discussed previously. The app(s) may be a native apps designed to operate within a dedicated application container, web apps designed to operate in a web browser operated by the user system 12, or a hybrid application designed to, for example, render and operate web applications within a dedicated application container or skeleton. The processor system 12A implementing the app(s) may be capable of interacting with the app server 100 to request and obtain data from database system 16, and rendering graphical user interfaces (GUIs) and/or a collection of components (e.g., tabs, reports, dashboards, widgets, pages, etc.) in an application container or browser. Furthermore, the app(s) may also enable the user system 12 to provide authentication credentials (e.g., user identifier (user_id), password, personal identification number (PIN), etc.) to the database system 16 so that the database system 16 may authenticate the identity of a user of the user system 12.

These app(s) may be platform-specific, such as when the user system 12 is implemented in a mobile device, such as a smartphone, tablet computer, and the like. Application 510 may be developed with server-side development tools and/or programming languages, such as PHP, Node.js, ASP.NET, and/or any other like technology that renders HTML; using website development tools and/or programming languages, such as HTML, Cascading Stylesheets (CSS), JavaScript, JQuery, and the like; and/or using platform-specific development tools and/or programming languages (e.g., Salesforce® Apex, Salesforce® Visualforce®, Salesforce® Lightning® Salesforce® Wave™ Dashboard. Designer, Salesforce® Force.com® IDE, Android® Studio®"" integrated development environment (IDE). Apple® iOS® software development kit (SDK), etc.), The term "platform-specific" may refer to the platform implemented by the user system 12 or a platform implemented by the database system 16. In some cases, the owner/operator of database system 16 may have pre-built the app(s) for use by agents of an org to access a tenant space or enterprise social network of that organization/tenant. In some cases, developers associated with the tenant org may build custom app(s) for interacting with the tenant data. In these cases, users of the user systems 12 may be agents of the tenant org. Suitable implementations for the OS, databases, and app(s), as well as the general functionality of the user system 12 are known or commercially available, and are readily implemented by persons having ordinary skill in the art, particularly in light of the disclosure herein.

The processor systems 12A of each user system 12 may implement an app to generate and send a request 320 to the app server 100 for various items 315. In response, the app server 100 may send a response 325 including the requested items 315 to the user system 12. The request 320 and response 325 may be any suitable message type or format, such as an HTTP message, a Session Initiation Protocol (SIP) message, Real-time Transport Protocol (RTP) message, Extensible Messaging and Presence Protocol (XMPP) message, and/or the like. The various items 315 included in the response 325 may include, for example, program code or web objects (e.g., HTML, XML, JSON, MessagePack™, or other like documents; and/or web content including audio, image, video files, etc.), database objects (DBOs) datasets, fields, records, data elements, data values, etc.), and/or the like.

In embodiments, each user system 12 may implement a caching mechanism 312*c*, where various recently accessed cached items 315 may be stored in memory system 12B. Additionally, a corresponding caching mechanism 312*s* may be implemented by the app server 100. The caching mechanism 312*c* may include any suitable system, program code, etc. that, upon receipt, temporarily stores requested items 315 in cache 322. The caching mechanism 312*c* may include aspects of web caching mechanisms and DB caching mechanisms. A web caching mechanism may temporarily store web objects, and a DB caching mechanism may temporarily store DBOs from a multi-tier, multi-tenant DB system, such as DB system 16. For example, the caching mechanism 312*c* may cache responses 325 to requests 320 according to certain rules, policies, configurations, etc. Subsequent requests for the cached items 315 may be obtained from the cache 322 in certain circumstances instead of sending the requests 320 to the app server 100 for those items 315. In some implementations, various components throughout the delivery path (e.g., intermediate nodes or hops, web accelerators, proxy servers, etc.) may also cache items to speed up subsequent requests 320, subject to the caching policies for the items 315.

The cache 322 (also referred to as "forward cache" or the like) may be any dedicated (physical or logical) memory area or region that may be used to store cached items 315. In most embodiments, the cache 322 may be browser cache of a web browser implemented by the user system 12, a DB application cache or an application used to access DB system 16, a virtual proxy server, or the like. In these embodiments, the cache 322 may be a reserved section of the memory system 12B, In some implementations, the cache 322 may include or may be embodied as a cache memory device that the processor system 12A can access more quickly than other types of memory (for example, such as an on-die cache, an on-processor cache, or an off-die cache that resides on same system on chip (SoC), system in package (SiP) as the processor system 12A).

Issues may arise when the cached items 315 are no longer fresh. The term "fresh" or "freshness" may refer to cached items 315 that are still considered to be a candidate to be served to the user system 12. In some cases, items 315 in cache 322 of the memory system 12B may be served to the user system 12 if those items 315 are within a freshness time frame or period as specified by the caching policy. When an item 315 is no longer fresh, it may be referred to as a "stale" item 315. Stale items 315 may be cached items 315 that have expired according to cache freshness settings in a caching policy. In general, expired or stale items 315 can or should not be used to respond to user system 12 requests, and the user system 12 should re-contact the app server 100 to retrieve the new or updated items or at least verify that the cached items 315 are still accurate or relevant. In particular, various items may be invalidated by the app server 100. The terms "invalidate", "invalidation", or the like may refer to the process of removing items 315 from the cache of memory system 1213 before an expiration date of those items 315. Various items 315 may be invalidated if such items 315 have been deleted, updated, or otherwise changed at the app server 100 (or in a tenant space within database system 16).

Having an outdated item 315 in cache can cause significant issues for the user system 12. In particular, DBOs may be updated by multiple users associated with a tenant organization (org), and data inconsistencies, errors, etc. may become prevalent if a user system 12 alters a cached DBO that has been changed by another user system 12. As an example, a DBO may be fresh for user system 12-1 and stale for user system 12-2 depending on the time that the DBO is requested 320 from the app server 100. In these cases, the caching mechanism 312s may inform the caching mechanism 312s at the user system 12 about changes made to DBOs. In order to inform the client about updated DBOs, the app server 100 may generate and send an invalidation message 327 to the user system 12 to invalidate one or more of the cached items 315. This may require the app server 100 to track the various changes/updates to the DBOs. Additionally, the caching mechanism 312s may be required to request 320 the DBOs multiple times to ensure that the cached items 315 remain fresh.

In various embodiments, the caching mechanism 312s may include a lazy tracking mechanism in order to track DBOs that have been updated for the user systems 12, to reduce network traffic associated with sending invalidation signals/messages 327, and to compute the batch invalidation signals/messages 327 that need to be sent to each user system 12. The term "lazy tracking" may refer to a tracking strategy where determining dirty DBOs for caching only takes place when needed (e.g., asynchronously) and in a way that avoids repeated evaluations and/or signaling. Additionally, the caching mechanism 312s may also be referred to as a "lazy caching mechanism 312s", "lazy tracking mechanism 312s", or the like. The lazy tracking mechanism 312s implemented by the app server 100 may track and perform asynchronous (async) computation of dirty DBOs for the user system caching mechanism 312c and/or cache 322. The term "dirty DBO". "dirty record", or the like may refer to a stale DBO of the cached items 315 (e.g., an incomplete DBO, out-of-date DBO, etc.). The async computation of dirty records may include tracking or accounting for stale or invalidated DBOs relevant to a particular user system 12.

In embodiments, the lazy tracking mechanism 312s may be used to create and update a Client Record Subscription Map (CRSM) 305 and create Client Dirty Records Maps (CDRMs) 310. The CRSM 305 may be a DBO that includes or indicates changes/updates to DBOs made by different user systems 12. In some implementations, the CRSM 305 may be a DBO, table, or other like data structure that stores key-value pairs (KVPs) or other like data elements. The each KVP may include a key to indicate a client identifier (client_id) of a user system 12 that sends a request 320 to update the DBO, and a value to indicate a version of the DBO after application of the update indicated by the request.

The lazy tracking mechanism 312s may be used to create and updated a CDRM 310 for each user system 12 or each client_id in the CRSM 305 in individual threads. Each CDRM 310 may indicate updates to DBOs that were previously requested by a corresponding user system 12, such as by including DBO identifiers (Ws) of each DBO that a user system 12 has requested to update/change. For example, the lazy tracking mechanism 312s may create/update a CDRM 310-1 for the user system 12-1 that includes DBO IDs of each requested DBO update, create/update a CDRM 310-2 for the user system 12-2 that includes DBO IDs of each requested DBO update, and create/update a CDRM 310-3 for the user system 12-3 that includes DBO IDs of each requested DBO update. In embodiments, the lazy tracking mechanism 312s may include a CDRM 310 in an invalidation message 327 to indicate fresh or updated DBOs or other items 315. In this way, the app server 100 does not need to construct a CDRM 310 for each user system 12 upon receipt of a request 320 because the CDRMs 310 have already been generated for respective user systems 12 as updates are made to the tracked/monitored DBOs. Additionally, the app server 100 may only need to fetch and send the CDRMs 310 to respective user systems 12 in respective invalidation messages 327 upon request 320.

In embodiments, the lazy tracking mechanism 312s may implement various cache replacement policies, which may define time-to-live (TM), least-recently-used (LRU), or other like constraints. In some implementations, the cache replacement policy may indicate an amount of time between accesses and/or a number of versions that a record may have before being discarded from the CRSM 305. For example, DB identifiers (db_id) in the CRSM 305 may be removed from the CRSM 305 if they have not been accessed by any user system 12 for more than a threshold period of time. In another example, a version identifier for a db_id in a CRSM 305 may be reverted to an initial version (e.g., version (v) 0) after a threshold number of updates or threshold number of versions of the DBO have been reached.

In some embodiments, the cache replacement policy may indicate a number of users or clients for which a CDRM 310 may be maintained. For example, all DBOs for a particular user system 12 may be removed for the user system 12 who has not contacted the app server 100 for a threshold period of time. In another example, all DBOs for a particular user system 12 may be removed for that user system 12 who has not contacted the app server 100 for a longest period of time among a group of user systems 12 (e.g., a user system 12 whose CDRM 310 was created the earliest in time among the user systems 12 in the group). In both examples, the user system 12 may be required to request all records when the client polls for dirty records/DBOs. Additionally, the cache replacement policies may indicate a threshold number of records that may be included in each CDRM 310. When removing records in a CDRM 310, the client identifier (client_id) of a user system may also be removed from the CRSM 305 for that DBO. The user systems 12 and app server 100 of arrangement 300 may operate according to the procedure discussed with regard to FIG. 4.

Figure 4:
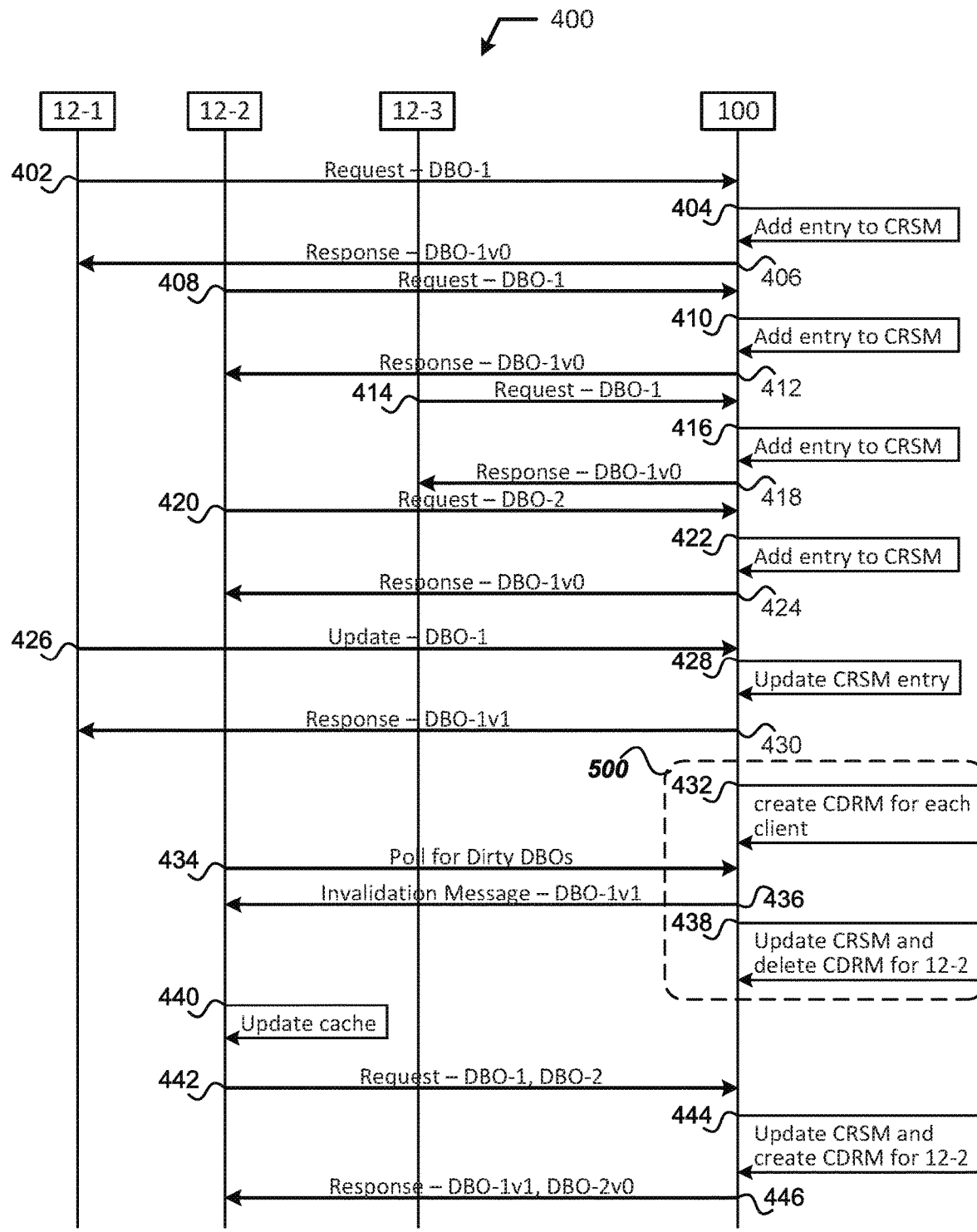
FIG. 4 shows an example process for practicing the various embodiments discussed herein.
Figure 5:
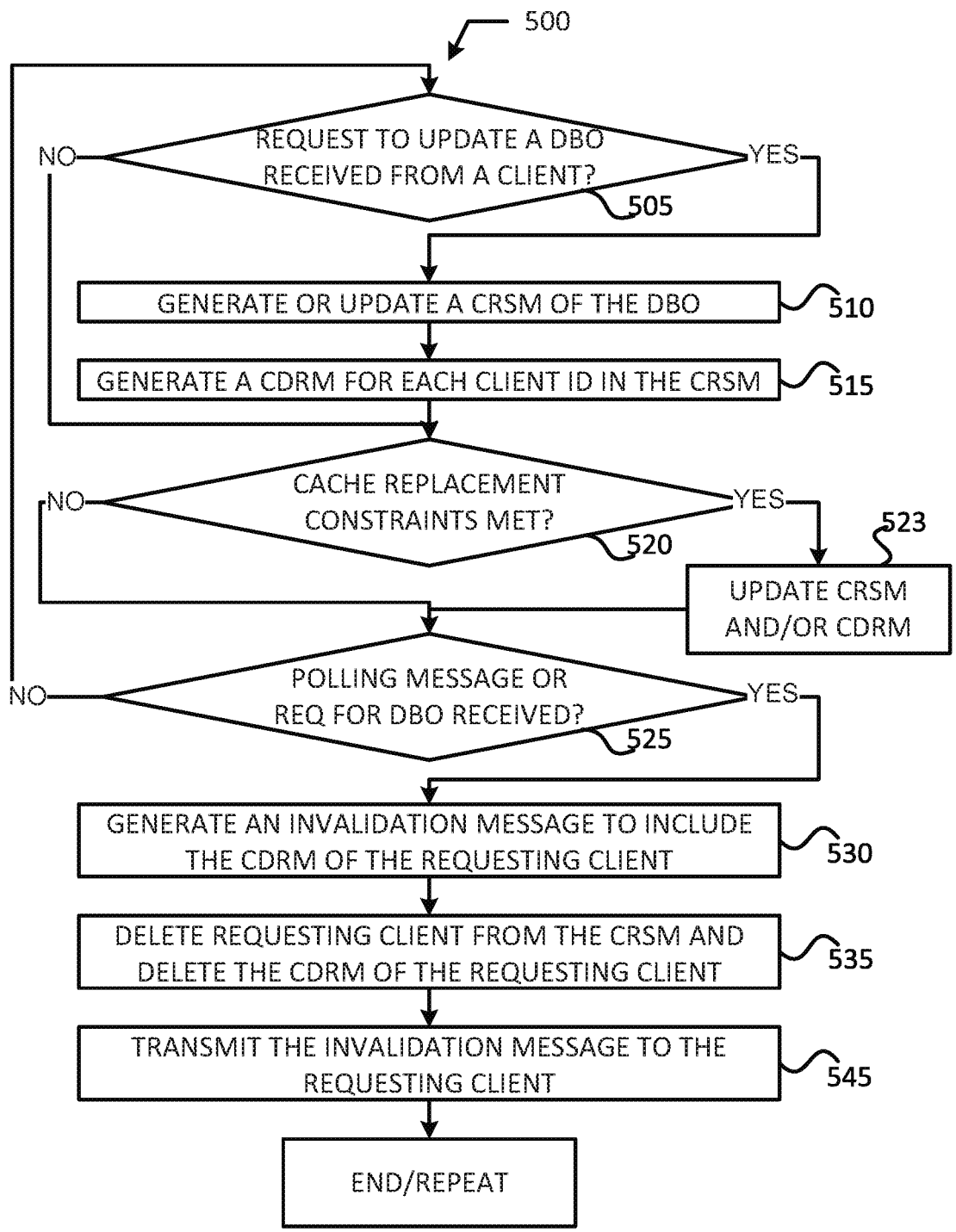
FIG. 5 shows an example asynchronous caching process of a server-side caching mechanism in accordance with various example embodiments.
Figure 6:
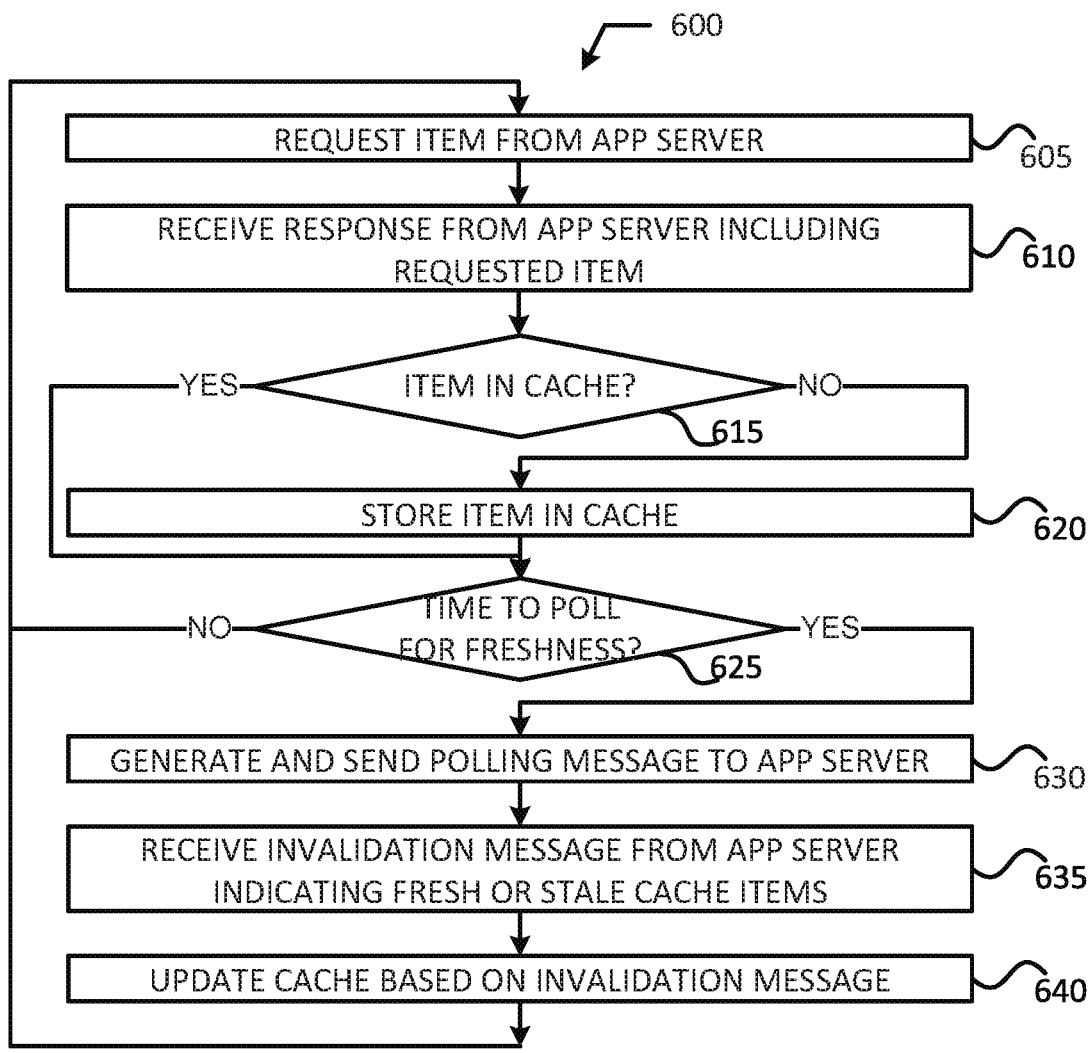
FIG. 6 shows an example process of a client-side caching mechanism in accordance with various example embodiments.

FIGS. 4-6 illustrates various processes for practicing the example embodiments discussed herein. For illustrative purposes, the operations of processes of FIGS. 4-6 are described as being performed by elements/components/devices shown and described with regard to FIGS. 1A-3; however, other computing devices may operate the depicted processes in a multitude of implementations, arrangements, and/or environments. In embodiments, the processes may be embodied as program code stored in a memory system, which when executed by a processor system of a computer system, causes the computer system to perform the various operations of such processes. While particular examples and orders of operations are illustrated in FIGS. 4-6, in various embodiments, these operations may be re-ordered, separated into additional operations, combined, or omitted altogether.

FIG. 4 illustrates a process 400 for operating a lazy tracking mechanism 312s in accordance with various embodiments. Process 400 may begin at operation 402 where the user system 12-1 sends a request 320 to obtain a DBO (DBO-1) to the app server 100. At operation 404, the app server 100 may update a CRSM 305, and at operation 406, the app server 100 may send a response 325 that includes the DBO-1 to user system 12-1. As mentioned previously, the CRSM 305 may be a DBO that stores a DBO ID, version number, and client ID of each user system 12 that requests to access a particular DBO. An example of a CRSM 310 after operation 404 is shown by table 1.

TABLE 1

| CRSM after operation 404 | |
| --- | --- |
| DBO ID-DBO version | Client ID-DBO version |
| dbold_1-v0 | clientID_12-1-v0 |

In this example, the user system 12-1 may have a client ID of "clientId_12-1", and DBO-1 may have a DBO ID of "dboId_1". Additionally, DBO-1 may be a first version (or version "0") that has been accessed, which is indicated as "v0" in table 1. The example shown by table 1 may include two record types, "DBO ID—DBO version" and "Client ID—DBO version". The term "record type" may refer to a field or column of a DBO, which may indicate the type of values or data that can be stored in a record of that record type. Table 1 also stores two records, namely, record "dboId_1-v0" having a "DBO ID—DBO version" record type and record "clientId_12-1 v0" having a "Client ID—DBO version" record type. The term "record" may refer to a single instance of an object or data element. The two records shown by table 1 may be a "relationship" or "relation", which may be any connection between two objects. Furthermore, the records stored by table 1 each include attribute value pairs (AVPs), which may be a data representation including an attribute and a value where the attribute defines a property of the value. For example, record "dboId_1—v0" may include the DBO ("dboID_1") as a value and the version ("v0") may be an attribute of that value, and record "clientId_12-1—v0" may include the client ID ("clientId_12-1") as a value and the latest version of DBO-1 ("v0") may be an attribute of that value.

At operation 408, the user system 12-2 may send a request 320 for the DBO-1 to the app server 100. At operation 410, the app server 100 may update the CRSM 305, and at operation 412, the app server 100 may send a response 325 that includes the DBO-1 to user system 12-2. At operation 414, the user system 12-3 may send a request 320 for the DBO-1 to the app server 100. At operation 416, the app server 100 may update the CRSM 305, and at operation 418, the app server 100 may send a response 325 that includes the DBO-1 to user system 12-3. An example of a CRSM 310 after operation 410 is shown by table 2, and an example of a CRSM 310 after operation 416 is shown by table 3.

TABLE 2

| CRSM after operation 410 | |
| --- | --- |
| DBO ID-DBO version | Client ID-DBO version |
| dbold_1-v0 | clientId_12-1-v0 |
| | clientId_12-2-v0 |

TABLE 3

| CRSM after operation 416 | |
| --- | --- |
| DBO ID-DBO version | Client ID-DBO version |
| dbold_1-v0 | clientId_12-1-v0 |
| | clientId_12-2-v0 |
| | clientId_12-3-v0 |

As shown by tables 2 and 3, the user system 12-2 has a client ID of "useId_12-2" and the user system 12-3 has a client ID of "clientId_12-3", The user systems 12-2 and 12-3 each requested version 0 of DBO-1, which is also indicated by tables 2 and 3. The records in tables 2 and 3 may have similar AVPs as discussed previously with regard to table 1.

At operation 420, the user system 12-2 may send a request 320 for a DBO-2 to the app server 100. At operation 422, the app server 100 may update the CRSM 305, and at operation 424, the app server 100 may send a response 325 that includes the DBO-2 to user system 12-2. An example of the CRSM 310 after operation 422 is shown by table 4.

TABLE 4

| CRSM after operation 422 | |
| --- | --- |
| DBO ID-DBO version | Client ID-DBO version |
| dbold_1-v0 | clientId_12-1-v0 |
| | clientId_12-2-v0 |
| | clientId_12-3-v0 |
| dbold_2-v0 | clientId_12-2-v0 |

At operation 426, the user system 12-1 may send a request 320 to update the DBO-1. At operation 428, the app server 100 may update the CRSM 305 to indicate that the DBO-1 has been updated, and at operation 430, the app server 100 may send a response 325 to the user system 12-1 that includes the updated DBO-1, in this case DBO-1 version 1 (DBO-1v1). An example of the CRSM 305 after operation 428 is shown by table 5.

TABLE 5

| CRSM after operation 428 | |
| --- | --- |
| DBO ID-DBO version | Client ID-DBO version |
| dbold_1-v1 | clientId_12-1-v1 |
| | clientId_12-2-v0 |
| | clientId_12-3-v0 |
| dbold_2-v0 | clientId_12-2-v0 |

In embodiments, the update to DBO-1 may trigger the asynchronous caching process 500. As shown by FIG. 4, the asynchronous (async) caching process 500 may begin at operation 432, where the app server 100 may analyze the CRSM 305 and may create a CDRM 310 for each client listed in the CRSM 305 (e.g., user systems 12-1, 12-2, and 12-3). In alternative embodiments, the async caching process 500 may generate a CDRM 310 for each client in the CRSM 305 after a client ID is added to the CRSM 305 (e.g., after each of operation 404, 410, and 416) or may generate a CDRM 310 for each client in the CRSM 305 once the CRSM 305 reaches a threshold number of entries.

Furthermore, in some cases, when a DBO is updated by way of a request 320, one or more other related or associated DBOs may also be (indirectly) updated as a result of the single DBO being updated. This may happen, for example, when data entries in one or more DBOs is linked to the data entries in one or more other DBOs. In these cases, operation 428 may include updating the version of multiple DBOs in the CRSM 305, as well as updating or creating multiple CDRMs 310, based on a single request 320.

Each CDRM may indicate each DBO that has been requested or updated/changed by a particular client. As examples, after reading the CRSM 305, the async caching process 500 may create the CDRMs 310 as shown by tables 6, 7, and 8.

TABLE 6

CDRM for user system 12-1 after operation 432

| Client ID | DBO ID |
|---|---|
| clientId_12-1 | dbold_1, . . . |

TABLE 7

CDRM for user system 12-2 after operation 432

| Client ID | DBO ID |
|---|---|
| clientId_12-2 | dbold_1, dbold_2, . . . |

TABLE 8

CDRM for user system 12-3 after operation 432

| Client ID | DBO ID |
|---|---|
| clientId_12-3 | dbold_1, . . . |

The CDRMs 310 of tables 6, 7, and 8 may be used to track the cached DBOs at the user systems 12-1, 12-2, and 12-3, respectively. Although this example only shows that user systems 12-1 and 12-3 has cached a single DBO (e.g., DBO-1 with DBO ID of "dbold_1"), and that user system 12-2 has cached two DBOs, in various embodiments, the CDRMs 310 may show some or all of the DBOs accessed by a user system 12 (represented by ellipsis in each of tables 5-7). In such embodiments, the app server 100 may implement the async caching process 500 to analyze a plurality of CRSMs 305 and may create a CDRM 310 for each client listed in each CRSM 305 of the plurality of CRSMs 305, where each of these CDRMs 310 may list all of the DBO IDs in each CRSM 305.

At operation 434, the user system 12-2 may poll for fresh items (or for dirty DBOs) by sending a request 320 for any previously requested or accessed DBOs stored by a local cache 322 of user system 12-2. In some embodiments, this polling message 320 may simply indicate that the caching mechanism 312c at user system 12-2 would like to know which cached items 315 are fresh or stale. In other embodiments, the polling message 320 may indicate specific cached items 315 that it would like to know are fresh or stale, for example, by including a DBO ID of the specific cached items 315 in a body portion of the polling message 320. In response, the app server 100 at operation 430 may send an invalidation message 327 to the user system 12-2, which may indicate the latest versions of the previously requested or accessed DBOs (e.g., DBO-1). In some embodiments, rather than sending a polling message 320 at operation 434, the app server 100 may send an invalidation message 327 in response to a request 320 for other DBOs (this may be referred to as "piggyback invalidation", "piggybacking", or the like). However, in embodiments, the app server 100 may send invalidation messages 327 in response to polling messages 325 and piggyback invalidation messages 327 in or with responses 325.

At operation 438, in response to the polling message 320 and/or sending the invalidation message 327, the app server 100 may update the CRSM 305 by removing the entry including the client ID of user system 12-2, and may delete the CDRM 310 for user system 12-2. Examples of the CRSM 305 and the CDRM 310 for user system 12-2 after operation 438 are shown by tables 9 and 10, respectively.

TABLE 9

CRSM after operation 438

| DBO ID-DBO version | Client ID-DBO version |
|---|---|
| dbold_1-v1 | clientId_12-1-v1 |
|  | ~~clientId_12-2-v0~~ |
|  | clientId_12-3-v0 |
| ~~dbold_2-v0~~ | ~~clientId_12-2-v0~~ |

TABLE 10

CDRM for user system 12-2 after operation 438

| ~~Client ID~~ | ~~DBO ID~~ |
|---|---|
| ~~clientId_12-2~~ | ~~dbold_1, dbold_2-v0, . . .~~ |

In tables 8 and 10, deleted records are indicated by strike-through text. For performance of operation 438, the app server 100 does not need to construct the CDRM 310 for user system 12-2 because the async caching process 500 has already created the CDRM 310 for the user system 12-2. Instead, the async caching process 500 may simply fetch the CDRM for user system 12-2, generate the invalidation message 327 to include the CDRM for user system 12-2, and then send the invalidation message 322 to the user system 12-2. In response to receipt of the invalidation message 327, the user system 12-2 may update a local cache 322 at operate 440. At operation 440, the user system 12-2 may implement the caching mechanisms 312c to remove any cached items 315 that are indicated as being stale by the invalidation message 327.

Subsequently, the user system 12-2 may send another request 320 for the DBO-1 at operation 442. This request may be sent based on the user's typical use and/or interaction with the tenant space, or may be in response to the removal of DBO-1 from cache 322. In either case, at operation 444 the app server 100 may update the CRSM 305 to include the user system 12-2 and create a new CDRM 310 for the user system 12-2. Examples of the CRSM 305 and the CDRM 310 for user system 12-2 after operation 444 are shown by tables 11 and 12, respectively.

TABLE 11

CRSM after operation 444

| DBO ID-DBO version | Client ID-DBO version |
|---|---|
| dbold_1-v1 | clientId_12-1-v1 |
|  | clientId_12-2-v1 |
|  | clientId_12-3-v0 |
| dbold_2-v0 | clientId_12-2-v0 |

TABLE 12

CDRM for user system 12-2 after operation 44

| Client ID | DBO ID |
|---|---|
| clientId_12-2 | dbold_1, dbold_2, . . . |

At operation 446, the app server 100 may send a response 325 to the user system 12-2, which includes the latest version of the requested DBO (e.g., DBO-1v1). After operation 446, process 400 may end or repeat as necessary.

FIG. 5 illustrates an example async caching process 500 of a caching mechanism 312s, which may be performed by an app server 100, in accordance with various example embodiments. Process 500 may begin at operation 505 where a processor system 100A of the app server 100 may implement the caching mechanism 312s to determine whether a request 320 to update a DBO has been received from a user system 12. If the caching mechanism 312s determines that a request 520 has not been received, the caching mechanism 312s may proceed to operation 520 to determine if any cache replacement constraints have been met. If the caching mechanism 312s determines that a request 520 has been received, then the caching mechanism 312s may proceed to operation 510 where the caching mechanism 312s may update a CRSM 305 of the DBO to indicate an association between the requesting user system 12 with a new version of the DBO (e.g., an AVP). At operation 515. the caching mechanism 312s may generate a CDRM 310 for each client/user system 12 indicated by the CRSM 305.

At operation 520, the caching mechanism 312s may determine whether any cache replacement constraints have been met. If at operation 520 the caching mechanism 312s determines that one or more cache replacement constraints have been met, then the caching mechanism 312s may proceed to operation 523 to update the CSRM 305 and/or the CDRM(s) 310 according to the cache replacement constraints, and may then proceed to operation 525. If at operation 520 the caching mechanism 312s determines that no cache replacement constraints have been met, then the caching mechanism 312s may proceed to operation 525 to determine whether a polling message 320 or another request message 320 has been received from any client that is a subscriber to the previously updated DBO.

As mentioned previously, the cache replacement constraints may be time-to-live (TTL) or least-recently-used (LRU) constraints that are defined by a cache replacement policy. TTL constraints may indicate or define an amount of time that a record may be stored in the CRSM 305 and/or a CDRM 310, and LRU constraints may indicate or define that the least recently used records should be discard before other records.

In an example of using a TTL constraint, at operation 520 the caching mechanism 312s may determine whether any records have not been accessed by any clients in the CRSM 305 for a period of time that is greater than or equal to X amount of time, and at operation 523, the caching mechanism 312s may remove records (e.g., client IDs) from the CRSM 305 that have not accessed the DBO for X period of time.

In an example of using an LRU constraint, at operation 520 the caching mechanism 312s may determine, for each user system 12, an amount of time between each access/contact with the app server 100, and at operation 523, the caching mechanism 312s may remove records (e.g., client IDs) from the CRSM 305 and a client's CDRM 310 for a user system 12 that has not contacted the app server 100 for a longest period of time (i.e., the client whose CDRM 310 was created the earliest in time). In this example, this client may be required to request 320 all cached items 315 when it polls for dirty records.

In embodiments, the cache replacement policy may also indicate other thresholds or maximum values for the CRSMs 305 and CDRMs 310. For example, the cache replacement policy may indicate a number of records to be stored per client a corresponding CDRM 310. This number may be equal to or greater than a preconfigured maximum count or threshold number of holding records, or may be based on subscription information. Additionally, the cache replacement policy may indicate that, when records are deleted from a CDRM 310 of a client, the client ID of that client may also be removed from the CRSM 305 for that DBO. In another example, the cache replacement policy may indicate a maximum or threshold number of versions that may be stored for a DBO, wherein the version number for a DBO ID may be reverted back to v0 the threshold or maximum version number has been reached.

Referring back to operation 525 of FIG. 5, if at operation 525 the caching mechanism 312s determines that a polling message 320 or another request message 320 has not been received, then the caching mechanism 312s may loop back to perform operation 505. if at operation 525, the caching mechanism 312s determines that a polling message 320 or another request message 320 has been received, then the caching mechanism 312s may proceed to operation 530 to generate an invalidation message 327 to include the CDRM 310 of the requesting/polling user system 12. At operation 535, the caching mechanism 312s may delete a record including the requesting/polling user system 12 from the CRSM 305 and delete the CDRM 310 of the requesting/polling user system 12. At operation 545, the caching mechanism 312s may instruct the network interface of the app server 100 to transmit the invalidation message to the requesting/polling user system 12. After performance of operation 545, process 500 may end or repeat as necessary.

FIG. 6 illustrates a caching mechanism 312c process 600 that may be performed by a user system 12, in accordance with various embodiments. Process 600 may begin at operation 605 where a communication system 12E of a user system 12 send a request 320 for an item 315 to an app server 100. At operation 610, the communication system 12E may receive a response 325 from the app server 100 that includes the requested item 315.

At operation 615, the processor system 12A may implement the caching mechanism 312c to determine whether the obtained item 315 is stored in cache 322. If the caching mechanism 312c determines that the obtained item 315 is stored in the cache 322, the caching mechanism 312c may proceed to operation 625. If the caching mechanism 312c determines that the obtained item 315 is not stored in the cache 322, the caching mechanism 312c may proceed to operation 620 to store the item 315 in the cache 322, and may then proceed to operation 625 to determine whether a polling message should be sent to the app server 100.

If at operation 625 the caching mechanism 312c determines that a polling message should not be sent to the app server 100, then the caching mechanism 312c may loop back to perform operation 605 based on user interactions with the applications implemented by the user system 12. If at operation 625 the caching mechanism 312c determines that a polling message should be sent to the app server 100, then the caching mechanism 312c may proceed to operation 630 to generate and send a polling message 320 to the app server 100.

At operation 635, the communication system 12E may receive an invalidation message 327 from the app server 100, where the invalidation message 327 may indicate or include fresh or stale items 315. At operation 640, the caching mechanism 312c may update the cache 322 based on the fresh or stale items 315 indicated by the invalidation message 327. This may include deleting stale items 315 from the cache 322 and/or storing fresh items 315 included in the invalidation message 327 in the cache 322. After operation 640, the processor system 12A may proceed back to perform operation 605.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. One or more non-transitory computer-readable media comprising a set of instructions that cause a computer device to act as an application server, in response to execution of the set of instructions by the computer device, to cause the computer device operable to:
update, in response to a received request to access a database object (DBO), a Client Record Subscription Map (CRSM) that indicates changes to DBOs made by different user systems, the CRSM to store an attribute value pairs (AVPs) associated with the DBO, the AVP comprising:
 a value to indicate a user identifier (ID) of a user system that sent the request to access the DBO, and
 an attribute to indicate a version of the DBO that is accessed by the user system;
 the CRSM includes one or more other AVPs that include user identifiers for other user systems that have sent requests to access the DBO, and corresponding attributes indicating versions of the DBO accessed by the other user systems;
generate or update, in response to a received request to update the DBO, a Client Dirty Records Map (CDRM) for each of the user systems, the CDRM indicating updates to any DBOs previously requested by the requesting user system, the CDRM including the user ID of the user system in the CRSM, and a DBO ID of each DBO that the user system requested to access;
send, in response to a received request from the user system for fresh or stale status of the DBO, an invalidation message to include the CDRM of the user system; and
revert the attribute indicating the version of the DBO when the DBO has been updated a threshold number of times.

2. The computer program of claim 1, wherein the set of instructions is operable to:
generate the CDRM for each user ID in the CRSM in response to receipt of the request to update the DBO;
generate the CDRM for each user ID in the CRSM once the CRSM reaches a threshold number of entries; or
generate the CDRM for each user ID in the CRSM after a user ID is added to the CRSM.

3. The computer program of claim 1, wherein the AVP is a first AVP and the CRSM is to store a second AVP in association with the first AVP, the second AVP comprising:
a value to indicate a DBO identifier (ID) of the DBO, and
an attribute to indicate the version of the DBO after the update indicated by the request is applied to the DBO.

4. The computer program of claim 3, wherein the CRSM is to store a plurality of first AVPs and each first AVP of the plurality of first AVPs is associated with a different user system than other ones of the plurality of first AVPs, and each first AVP is associated with the second AVP.

5. The computer program of claim 4, wherein the set of instructions is operable to:
delete an individual first AVP of the plurality of first AVPs when the DBO has not been accessed by a user system associated with the individual first AVP for a threshold period of time.

6. The computer program of claim 1, wherein the set of instructions is operable to:
delete a Least Recently Used (LRU) CDRM, the LRU CDRM being a CDRM of a user system that has sent a request to access the DBO a greatest amount of time that is greater than an amount of time that other user systems have sent a request to access the DBO.

7. The computer program of claim 6, wherein the set of instructions is operable to:
delete, from the CRSM, an AVP that is associated with the deleted LRU CDRM, the deleted AVP having a value that is equal to a user ID of the LRU CDRM.

8. The computer program of claim 1, wherein each generated CDRM is to store a predefined number of DBO IDs, and for each generated CDRM, the set of instructions is operable to:

delete a DBO ID that was added before all other DBO IDs in the generated CDRM when a threshold number of holding records has been reached; and delete, from the CRSM for the DBO associated with the deleted DBO ID, an AVP having a value that is equal to a user ID associated with the generated CDRM.

9. An application server comprising:

a network interface to receive requests to access a database object (DBO) from individual user systems; and a processor system coupled with a memory system, the processor system to:

update, in response to each received request to access the DBO, a Client Record Subscription Map (CRSM) that indicates changes to DBOs made by the user systems, the CRSM to store a first attribute value pair (AVP) in association with a second AVP, the first AVP comprising a first value to indicate a client identifier (ID) of a user system that sent a request to update the DBO, and a first attribute to indicate a version of the DBO after the update indicated by the request is applied to the DBO, and the second AVP comprising a second value to indicate a DBO ID of the DBO, and a second attribute to indicate the version of the DBO after the update indicated by the request is applied to the DBO; and the CRSM includes one or more other AVPs that include user identifiers for other user systems that have sent requests to access the DBO, and corresponding versions of the DBO that is accessed by the other user systems;

generate or update, in response to a received request to update the DBO, a Client Dirty Records Map (CDRM) for each client ID in the CRSM, each generated CDRM indicating updates to any DBOs previously requested by the corresponding user system, each generated CDRM to indicate a DBO ID of each DBO that the corresponding user system has requested to access;

send, in response to each received request for updated records of the DBO, an invalidation message to include a CDRM of a requesting user system; and revert the attribute indicating the version of DBO of an individual first of a plurality of first AVPs when the DBO of the individual first AVP has been updated a threshold number of times.

10. The application server of claim 9, wherein the processor system is to:

generate the CDRM for each user ID in the CRSM in response to receipt of a request to update the DBO;

generate the CDRM for each user ID in the CRSM once the CRSM reaches a threshold number of entries; or generate the CDRM for each user ID in the CRSM after a user ID is added to the CRSM.

11. The application server of claim 9, wherein the CRSM is to store a plurality of first AVPs and each first AVP of the plurality of first AVPs is associated with a different user system than other ones of the plurality of first AVPs, and each first AVP is associated with the second AVP.

12. The application server of claim 11, wherein the processor system is to:

delete an individual first AVP of the plurality of first AVPs when the DBO has not been accessed by a user system associated with the individual first AVP for a threshold period of time.

13. The application server of claim 11, wherein, in response to sending the invalidation message, the processor system is to:

delete a first AVP of the plurality of AVPs associated with the requesting user system from the CRSM; and delete the CDRM of the requesting user system that is included in the invalidation message.

14. The application server of claim 9, wherein the processor system is to:

delete a Least Recently Used (LRU) CDRM, the LRU CDRM being a CDRM of a user system that has sent a request to access the DBO a greatest amount of time that is greater than an amount of time that other user systems have sent a request to access the DBO.

15. The application server of claim 14, wherein the processor system is to: delete, from the CRSM, an AVP that is associated with the deleted LRU CDRM, the deleted AVP having a value that is equal to a user ID of the LRU CDRM.

16. The application server of claim 9, wherein each generated CDRM is to store a predefined number of DBO IDs, and for each generated CDRM, and the processor system is to:

delete a DBO ID that was added before all other DBO IDs in the generated CDRM when a threshold number of holding records has been reached; and delete, from the CRSM for the DBO associated with the deleted DBO ID, an AVP having a value that is equal to a user ID associated with the generated CDRM.

17. One or more non-transitory computer-readable media comprising a set of instructions that cause a computer device to act as an application server, in response to execution of the set of instructions by the computer device, to cause the computer device operable to:

update, in response to a received request to access a database object (DBO), a Client Record Subscription Map (CRSM) to store an attribute value pair (AVP) associated with the DBO, the AVP comprising:

a value to indicate a user identifier (ID) of a user system that sent the request to access the DBO, and an attribute to indicate a version of the DBO that is accessed by the user system;

the CRSM includes one or more other AVPs that include user identifiers for other user systems that have sent requests to access the DBO, and corresponding attributes indicating versions of the DBO accessed by the other user systems;

generate or update, in response to a received request to update the DBO, a Client Dirty Records Map (CDRM) for each of the user systems, the CDRM including the user ID of the user system in the CRSM, and a DBO ID of each DBO that the user system requested to access;

send, in response to a received request from the user system for fresh or stale status of the DBO, an invalidation message to include the CDRM of the user system;

delete the AVP associated with the requesting user system from the CRSM; and delete the CDRM of the requesting user system that is included in the invalidation message.

* * * * *